United States Patent [19]

VanRens et al.

[11] Patent Number: 5,086,825
[45] Date of Patent: Feb. 11, 1992

[54] METHOD FOR MANUFACTURING FOAM PATTERN ASSEMBLIES

[75] Inventors: Russell J. VanRens, Milwaukee, Wis.; Michael A. Proffitt, Burnsville, N.C.

[73] Assignee: Outboard Marine Corporation, Waukegan, Ill.

[21] Appl. No.: 521,590

[22] Filed: May 10, 1990

[51] Int. Cl.⁵ ............................................. B22C 7/02
[52] U.S. Cl. .................................. 164/4.1; 156/304.6; 164/34; 164/45
[58] Field of Search .................. 164/45, 34, 35, 36, 164/4.1, 235, 246; 156/304.6, 304.1, 267

[56] References Cited

U.S. PATENT DOCUMENTS

| | | | |
|---|---|---|---|
| 2,281,976 | 5/1942 | Hansen | 156/304.6 X |
| 3,313,143 | 4/1967 | Evans et al. | 164/4.1 X |
| 3,342,817 | 9/1967 | Young | 264/248 |
| 4,105,738 | 8/1978 | Rohn | 264/163 |
| 4,898,635 | 2/1990 | Kobari | 156/245 |

FOREIGN PATENT DOCUMENTS

| | | | |
|---|---|---|---|
| 2348607 | 4/1974 | Fed. Rep. of Germany | 156/304.6 |
| 2580985 | 10/1986 | France | 164/34 |
| 54-141868 | 11/1979 | Japan | 156/304.6 |
| 62-292236 | 12/1987 | Japan | 164/45 |

*Primary Examiner*—J. Reed Batten, Jr.
*Attorney, Agent, or Firm*—Michael, Best & Friedrich

[57] ABSTRACT

A foam pattern assembly includes a parting line, and a surface which is intersected by the parting line and which includes a first surface portion and a second surface portion offset from the first surface portion at the parting line. The surface is leveled so that the first surface portion is not offset from the second surface portion.

10 Claims, 1 Drawing Sheet

METHOD FOR MANUFACTURING FOAM PATTERN ASSEMBLIES

BACKGROUND OF THE INVENTION

The invention relates to foam pattern assemblies used in lost foam casting processes. More particularly, the invention relates to methods for manufacturing such foam pattern assemblies.

It is known to leak test a casting formed in a lost foam casting process. The purpose of the leak test is to test the integrity of the casting, i.e., to determine whether the casting "leaks." This is important, for example, when the casting is an engine block to be used in a two-stroke internal combustion engine. The leak test is performed by sealing all of the openings of the casting, filling the casting with pressurized air, and then determining whether the casting remains pressurized for a sufficient amount of time. The openings of the casting are sealed with a leak test fixture including a flexible sealing member or gasket surrounding each opening.

SUMMARY OF THE INVENTION

The invention provides a method for manufacturing a foam pattern assembly for use in a lost foam casting process, the method comprising the steps of providing a foam pattern assembly including a parting line, and a surface which is intersected by the parting line and which includes a first surface portion and a second surface portion offset from the first surface portion at the parting line, and leveling the surface so that the first surface portion is not offset from the second surface portion.

The invention also provides a method for manufacturing a foam pattern assembly, the method comprising the steps of providing a first foam pattern portion including a first glue surface and a first transverse surface portion extending transversely to the first glue surface, providing a second foam pattern portion including a second glue surface and a second transverse surface portion extending transversely to the second glue surface, gluing the first glue surface to the second glue surface along a parting line so that the first transverse surface portion and the second transverse surface portion form a pattern assembly surface with the first transverse surface portion being offset from the second transverse surface portion at the parting line, and leveling the pattern assembly surface so that the first transverse surface portion is not offset from the second transverse surface portion.

The invention also provides a method for manufacturing a foam pattern assembly for use in a lost foam casting process, the method comprising the steps of providing a foam pattern assembly including first and second pattern portions glued together along a parting line, and an exterior surface including a step at the parting line, and removing the step without moving the pattern portions relative to each other along the parting line.

It is preferable to leak test a casting before it is machined, since it is a waste of time and money to machine castings that fail the leak test. Many castings have steps caused by offset foam pattern portions. These steps make leak testing difficult and expensive because known gaskets are not both pliable enough to adequately seal over a step and durable enough to have a long life. The invention prolongs the life of leak test fixture gaskets by providing generally flat surfaces against which the gaskets seat.

Other features and advantages of the invention will become apparent to those skilled in the art upon review of the following detailed description, claims and drawings.

Figure 1:
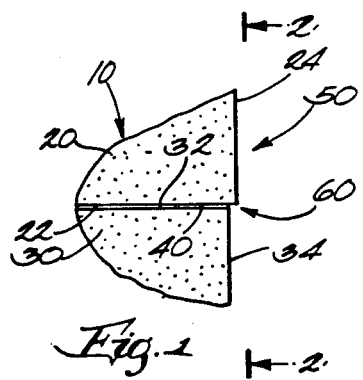
FIG. 1 is an elevational view of a foam pattern assembly on which the method of the invention is performed.

Before one embodiment of the invention is explained in detail, it is to be understood that the invention is not limited in its application to the details of the construction and the arrangements of components set forth in the following description or illustrated in the drawings The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 2:
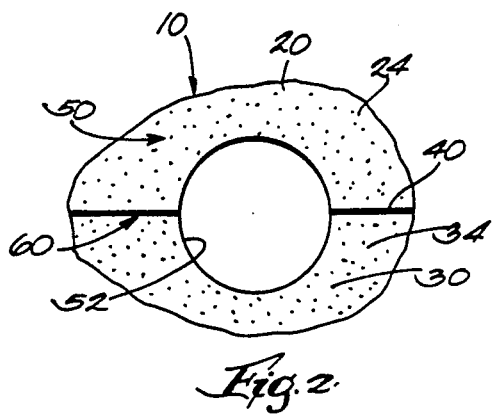
FIG. 2 is a view taken along line 2—2 in FIG. 1.

A foam pattern assembly 10 for use in a lost foam casting process is illustrated in FIGS. 1 and 2. The assembly 10 includes a first foam pattern portion 20 including a first glue surface 22 and a first transverse surface portion 24 extending generally perpendicularly to or transversely to the first glue surface 22. The assembly 10 also includes a second foam pattern portion 30 including a second glue surface 32 and a second transverse surface portion 34 extending generally perpendicularly or transversely to the second glue surface 32. The second glue surface 32 is glued to the first glue surface 22 along a parting line or plane 40 so that the first transverse surface portion 24 and the second transverse surface portion 34 form a generally planar exterior pattern assembly surface 50 which is intersected by the parting line 40 and which has therein an opening 52 that is intersected by the parting line 40. The first transverse surface portion 24 is slightly offset from the second transverse surface portion 34 so as to form a step 60 in the surface 50. In other words, the first and second transverse surface portions 24 and 34 are not exactly coplanar, but are slightly offset from each other at the parting line 40.

If the foam pattern assembly 10 illustrated in FIG. 1 is used to form a casting in a lost foam casting process, the resultant casting will have an opening corresponding to the opening 52 and a step corresponding to the step 60. The casting step will make leak testing difficult because it is difficult to provide a gasket that is pliable enough to adequately seal over the casting step and the casting opening and that is durable enough to have a long life. The solution to this problem is to remove the step 60 before casting.

The method of the invention comprises the steps of providing the first foam pattern portion 20 and the second foam pattern portion 30, and gluing the first glue surface 22 to the second glue surface 32 as described above. The method also comprises the step of leveling the pattern assembly surface 50 so that the first surface portion 24 is not offset from the second surface portion 34, i.e., so that the step 60 is removed and the surface portions 24 and 34 are coplanar. The leveling or removing step is performed after the relative positions of the pattern portions 20 and 30 are fixed. Thus, the leveling or removing step is performed without moving the first pattern portion 20 relative to the second pattern portion 30 along the parting line 40.

Figure 3:
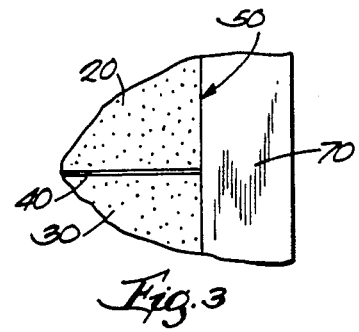
FIG. 3 illustrates one method of the invention.
Figure 4:
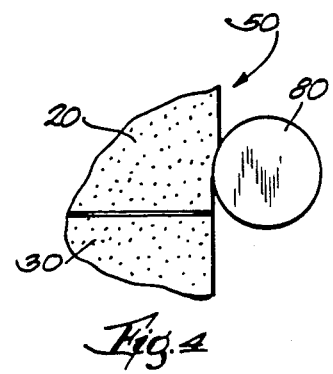
FIG. 4 illustrates an alternative method of the invention.

Two different methods for performing the leveling or removing step are illustrated in FIGS. 3 and 4. In the method illustrated in FIG. 3, the leveling step includes the step of providing a hot plate 70, and pressing the hot plate 70 against the surface 50. The hot plate 70 actually melts one or both of the surface portions 24 and 34 until the surface portions 24 and 34 are coplanar. In the method illustrated in FIG. 4, the leveling step includes the steps of providing a heated roller 80, and rolling the roller 80 along the surface 50.

Figure 6:
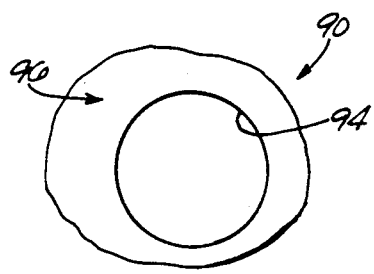
FIG. 6 is a view taken along line 6—6 in FIG. 5.
Figure 5:
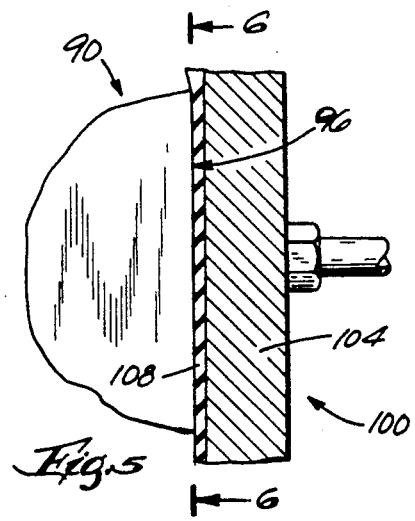
FIG. 5 is an elevational view of the resultant casting being leak tested after performance of the method of the invention

Shown in FIGS. 5 and 6 is a casting 90 which results when the pattern assembly 10 is used, after leveling of the surface 50, in a lost foam casting process. The casting 90 has therein an opening 94 corresponding to the opening 52, and the casting 90 has a smooth surface 96 (corresponding to the surface 50) without a step. The smooth surface 96 improves the seal between the below-described gasket and the surface 96 and prolongs the life of the gasket.

An apparatus 100 for leak testing the casting 90 is illustrated in FIG. 5. The apparatus 100 includes a leak test fixture 104 including a flexible sealing member or gasket 108 which sealingly engages the surface 96 and which surrounds the opening 94. As explained above, the absence of a step on the casting surface 96 improves the seal between the gasket 108 and the surface 96 and prolongs the life of the gasket 108.

Various features of the invention are set forth in the following claims.

We claim:

1. A method for manufacturing a casting from a foam pattern assembly in a lost foam casting process, said method comprising the steps of providing a foam pattern assembly including a parting line, and a surface which is intersected by said parting line and which includes a first surface portion and a second surface portion offset from said first surface portion at said parting line, leveling said surface so that said first surface portion is not offset from said second surface portion, using said foam pattern assembly in a lost foam casting process to form a casting including a surface corresponding to said surface of said foam pattern assembly, and leak testing said casting by using a leak test fixture including a sealing member, and placing said sealing member against said surface of said casting.

2. A method as set forth in claim 1 wherein said lost foam pattern assembly providing step also includes providing the lost foam pattern assembly with an opening extending from said surface and intersecting said parting line, and wherein said placing step includes placing said sealing member over said opening and across said parting line.

3. A method for manufacturing a foam pattern assembly, said method comprising the steps of providing a first foam pattern portion including a first glue surface and a first transverse surface portion extending transversely to said first glue surface, providing a second foam pattern portion including a second glue surface and a second transverse surface portion extending transversely to said second glue surface, gluing said first glue surface to said second glue surface along a parting line so that said first transverse surface portion and said second transverse surface portion form a pattern assembly surface with said first transverse surface portion being offset from said second transverse surface portion at said parting line, and leveling said pattern assembly surface by a heated member so that said first transverse surface portion is not offset from said second transverse surface portion.

4. A method as set forth in claim 3 wherein said leveling step includes the steps of providing a hot plate, and pressing said hot plate against said surface.

5. A method as set forth in claim 3 wherein said leveling step includes the steps of providing a heated roller, and rolling said roller along said surface.

6. A method as set forth in claim 3 and further comprising the steps of using said foam pattern assembly in a lost foam casting process to form a casting including a surface corresponding to said surface of said foam pattern assembly, and leak testing said casting by providing a leak test fixture including a sealing member, and placing said sealing member against said surface of said casting.

7. A method for manufacturing a foam pattern assembly for use in a lost foam casting process, said method comprising the steps of providing a foam pattern assembly including first and second pattern portions glued together along a parting line, and an exterior surface including a step at said parting line, and removing said step with a heated member and without moving said pattern portions relative to each other along said parting line.

8. A method as set forth in claim 7 wherein said removing step includes the steps of providing a hot plate, and pressing said hot plate against said surface.

9. A method as set forth in claim 7 wherein said removing step includes the steps of providing a heated roller, and rolling said roller along said surface.

10. A method as set forth in claim 7 and further comprising the steps of using said foam pattern assembly in a lost foam casting process to form a casting including a surface corresponding to said surface of said foam pattern assembly, and leak testing said casting by providing a leak test fixture including a sealing member, and placing said sealing member against said surface of said casting.

* * * * *